United States Patent [19]

Lang

[11] Patent Number: 4,811,806

[45] Date of Patent: Mar. 14, 1989

[54] SERVOSTEERING, ESPECIALLY FOR MOTOR VEHICLES

[75] Inventor: Armin Lang, Schwabisch Gmund, Fed. Rep. of Germany

[73] Assignee: Zahnradfabrik Friedrichshafen, AG., Friedrichshafen, Fed. Rep. of Germany

[21] Appl. No.: 886,379

[22] Filed: Jul. 17, 1986

[30] Foreign Application Priority Data

Aug. 3, 1985 [LU] Luxembourg .................. 00390

[51] Int. Cl.[4] ........................................... B62D 5/08
[52] U.S. Cl. ..................................... 180/141; 91/434; 251/129.02; 251/129.15
[58] Field of Search ............... 180/132, 136, 141, 142, 180/143, 79.3; 91/434, 437; 251/129.02, 129.15

[56] References Cited

U.S. PATENT DOCUMENTS

| 2,893,504 | 7/1959 | Jackson | 180/143 |
|---|---|---|---|
| 4,463,819 | 8/1984 | Becker | 180/132 |
| 4,573,659 | 3/1986 | Homes | 251/129.02 |
| 4,629,025 | 12/1986 | Brasier | 180/142 |
| 4,640,380 | 2/1987 | Daido | 180/141 |

FOREIGN PATENT DOCUMENTS

| 2315424 | 10/1974 | Fed. Rep. of Germany | 251/129.02 |
|---|---|---|---|
| 2336195 | 2/1975 | Fed. Rep. of Germany | 180/132 |
| 2308537 | 11/1976 | France | 180/141 |
| 152662 | 9/1983 | Japan | 180/142 |
| 99181 | 6/1984 | Japan | 251/129.15 |
| 2099770 | 12/1982 | United Kingdom | 180/132 |

*Primary Examiner*—David M. Mitchell
*Assistant Examiner*—Everett G. Diederiks, Jr.
*Attorney, Agent, or Firm*—Albert M. Zalkind

[57] ABSTRACT

In a servosteering arrangement, a control mechanism combines a pressure operated valve responsive to servomotor chamber pressure, and a solenoid and plunger responsive to speed of the vehicle by means of a proportional magnet solenoid for controlling reaction chamber pressure and thus the manual force required to be exerted by a driver for steering a vehicle. Thus, a variable throttle pressure responsive valve combined with a speed responsive solenoid responsive inversely to speed, controls the manual steering force necessary to effect steering at various speeds, particularly in tright curves at low speeds with high servomotor pressures. An important safety feature in the event of failure of solenoid current is the maintenance of openness of the pressure operated valve with consequent high resistance to steering.

9 Claims, 3 Drawing Sheets

SERVOSTEERING, ESPECIALLY FOR MOTOR VEHICLES

BACKGROUND OF THE INVENTION

The prior art contains examples of power steering systems utilizing reaction chambers which act on steering control valves in such a way as to simulate response to steering at various speeds of a vehicle. For example, such an arrangement is shown in German Patent OS No. 32 20 922. In that patent, the hydraulic reaction force is varied by means of a control mechanism comprising a speed responsive throttle which regulates or proportions the manual steering force at the steering wheel.

Usually booster steering systems are designed so that characteristic lines on a graph of their steering control speeds do not run precisely toward the zero point of the graph but are horizontally tangent to it. Accordingly, there is an initial steering reaction response which must be overcome by manual force at the steering wheel before the actual booster steering force commences. This is a requirement for good stability in straight-ahead travel.

Booster systems utilizing pressure in reaction chambers provide means for varying such pressure responsive to vehicle speed, and in such a manner that the characteristic lines for varying speeds become steeper with decreasing speed of the vehicle. Thus, initial steering reaction response, which may be called a centering force, causes at low speed small servomotor pressures and manual force at the steering wheel is disproportionately low for steeper characteristic lines. The simulated steering response achieved seems to be weak and uncertain because of low booster pressure due to slower speeds.

In servosteering systems which provide booster pressure, the manual steering force is limited in its magnitude to a maximum by means of a so-called "cut-off", namely, a pressure reduction valve which limits the pressure difference independently of a particular vehicle speed operating on a slanted characteristic line of a graph showing manual steering force vs. servomotor pressure. However, the steering seems to require more manual effort due to reaction chamber pressure in the range of medium or high speeds of the vehicle when steering in tight curves.

BRIEF DESCRIPTION OF THE PRESENT INVENTION

The invention herein improves the prior art steering in a manner such that at low servomotor pressures, for example, in straight-ahead travel, relatively high operating forces are active and thus stability in straight-ahead travel is achieved. Further, in the higher servomotor pressures, thus in traveling tight curves, only a slight increase of the manual steering force is required.

As a result of reduction in flow area of a speed responsive throttle with rising servomotor pressure during increasing of vehicle speed, characteristic lines on a curve become steeper in the range of higher servomotor pressures. The increasing steepness of such characteristic lines means that with increasing pressures the increase of the manual steering effort is lessened. Therefore, an improved steering sense results in all ranges of travel. A novel valve which combines the effects of booster pressure with vehicle speed, both providing forces to effect a closing off of flow which controls the pressures in the reaction chambers, affords the advantages of the invention.

A detailed description of the invention now follows, in conjunction with the appended drawing, in which FIG. 1 shows a graph of characteristic lines of a servosteering system in accordance with the status of the prior art;

Figure 1:
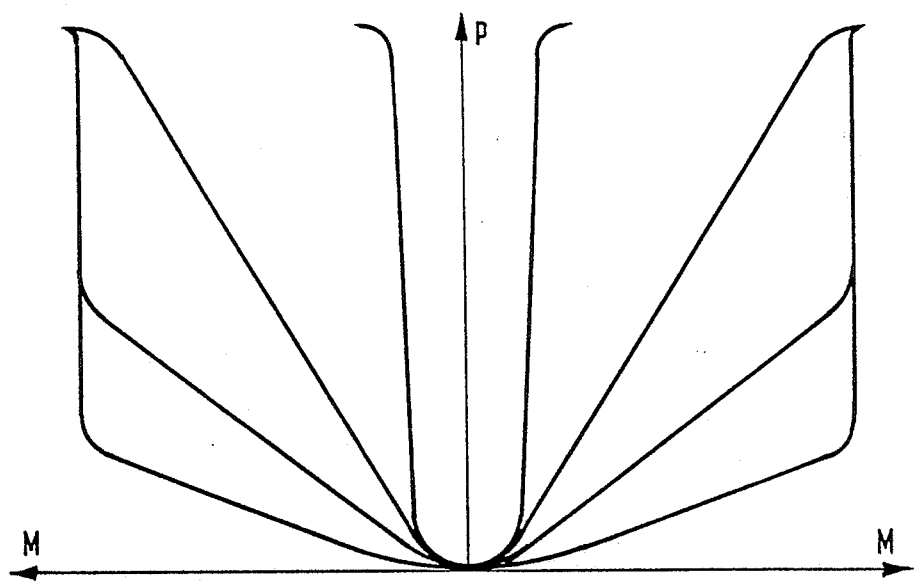

Referring to FIG. 1, the manual steering force is indicated by the letter M on the abscissa for steering to left and right. The servomotor pressure is "p" on the ordinate. The graph shows the variation of manual force in operating at various servomotor pressures for a series of speeds. Thus, the characteristic line having the steepest angle corresponds to a low speed almost parallel to the ordinate, while the outermost line is a characteristic for high speed, and the intermediate lines are for proportionally lower speeds as they approach the low speed line. It will be noted that the relatively lower slanting of the lines from the point of origin is for higher speeds. Also, it will be noted that the characteristic lines for higher speeds bend abruptly perpendicularly upwards at their ends for the characteristic lines depicting the two higher speeds. Accordingly, the response of so-called "cut-off" of booster flow effects a limiting of manual steering force at higher speeds.

Figure 2:
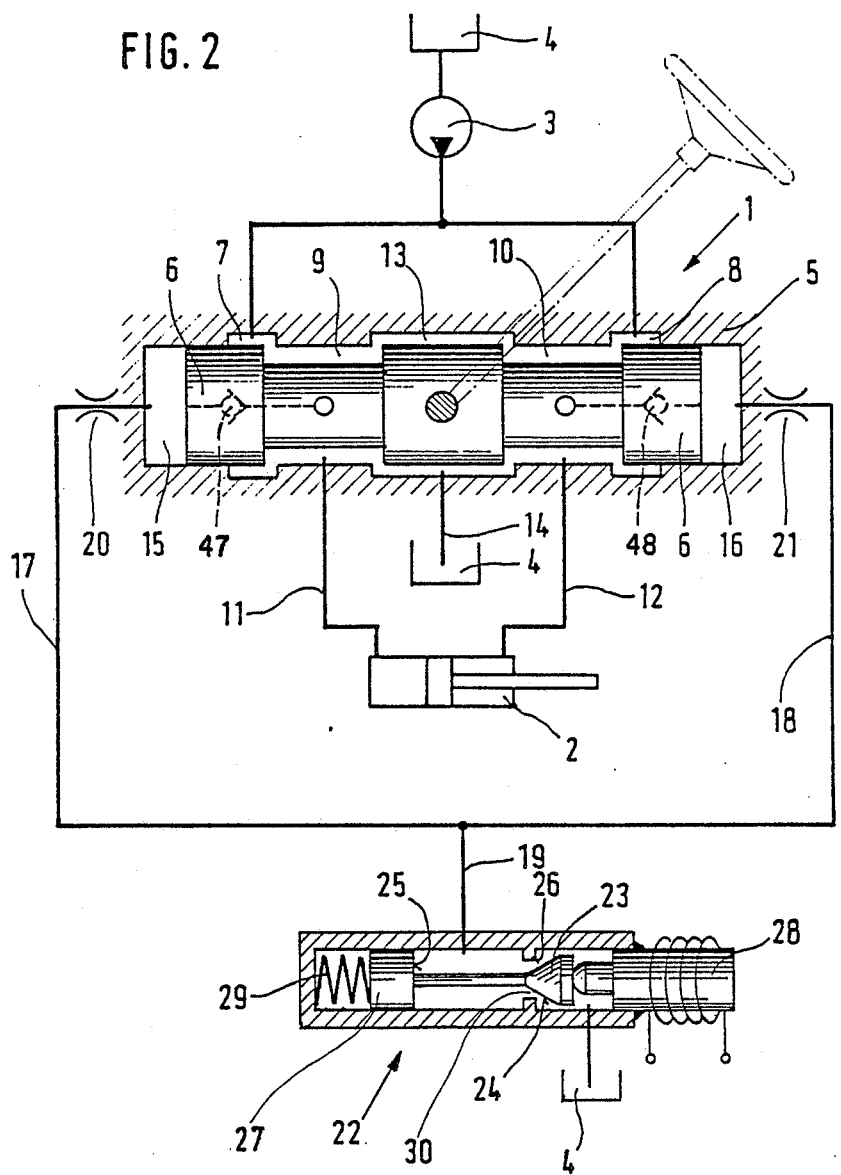
FIG. 2 shows a servosteering system having schematic valving of the invention.

Referring to FIG. 2, a steering control valve 1 is shown which will be understood to be operated by a steering wheel indicated in phantom lines for the conventional purpose of directing pressure flow from a servopump 3 to a servomotor 2 from whence it is carried back to tank 4. The steering control valve 1 has a valve piston 6 and valve housing 5 which is axially shiftable by the steering wheel.

Oil under pressure, i.e., a pressure agent, is fed to the steering control valve 1 by servopump 3 feeding to two annular pressure grooves 7 and 8 of the housing. Two annular grooves 9 and 10 of valve piston 6 connect via the respective conduits 11 and 12 with respective pressure chambers of servomotor 2. The centrally located annular groove 13 is provided in the housing for flow return, connecting to tank 4 via return conduit 14. Reaction chambers 15 and 16 are disposed at the ends of valve piston 6. The reaction chambers 15 and 16 have respective conduits 17 and 18 uniting into a common conduit 19.

In the conduits 17 and 18 from the reaction chambers 15 and 16 going to the common conduit 19, there are fixed orifices 20 and 21, respectively. The common conduit 19 connects through a control mechanism 22 into the tank 4. The control mechanism 22 includes a solenoid and plunger, which is proportionally speed responsive, and is combined with a pressure operated valve responsive to servomotor pressure.

The solenoid is responsive to the speed of the vehicle so that the greatest current in the solenoid occurs at the lowest speed.

Between the reaction chambers 15 and 16 and the respective pressure chambers of servomotor 2, there are respective check valves 47 and 48, through which oil can flow only in a direction toward the respective reaction chambers 15 and 16. The check valves 47 and 48 may be disposed as shown in FIG. 2 in the respective ends of valve piston 6 between piston grooves 9 or 10 and reaction chambers 15 or 16, as shown. However, the check valves can also be disposed between conduits 11 or 12 and via respective fixed orifices 20 and 21 to respective conduits 17 and 18, thus being exteriorly disposed of the valve piston.

Combined with the speed responsive valve is a pressure responsive valve which in this instance has a valve 23 in the control mechanism 22 having two pressure exposed faces 24 and 25, wherein the small exposed face 24 is a valve head to engage a valve seat 26. The face 24 is acted upon by servomotor pressure coming through valve opening or gap 30 between the conical valve head and the valve seat which tends to move the conical valve head toward the right, as seen in FIG. 2. On the other hand, the valve has a collar or piston with a large exposed face 25 of, e.g., collar 27, which exposed face is larger in area than that of the conical valve head of the valve 23. Thus, pressure acting on the two unequal faces will be a net force causing movement of valve head toward the left, viz., a closing direction of the flow gap between the conical head and the valve seat. Additional force operating to effect such closure is produced by preferably a proportional magnet solenoid 28 responsive inversely to vehicle speed. As apparent in FIG. 2, the solenoid plunger acts in the direction of closing of the gap against the bias of return spring 29 to cut off flow to the tank as vehicle speed decreases. Thus, opening 30 will be understood to vary in flow area cross section in a manner which is directly proportional to the speed of the vehicle in the sense that higher speeds increase the flow area by virtue of the spring bias means.

The invention has been described above in conjunction with a steering control valve having two reaction chambers 15 and 16. However, the invention may also be used for its intended purpose utilizing a steering control valve with only a single reaction chamber, as shown in FIG. 3.

Instead of the two reaction chambers 15 and 16, only one reaction chamber 50 is disposed at one end of the valve piston 51. Reaction chamber 50 is limited in an axial direction by two discs 52 and 53. Such discs 52 and 53 are held in contact by a compression spring 54 against respective collars 55 and 56 of valve piston 51, and also against shoulders of the valve housing 57, as shown.

Reaction chamber 50 is connected with servopump 3 via control mechanism 22 and also with the tank 4 through a fixed throttle 58.

Figure 3:
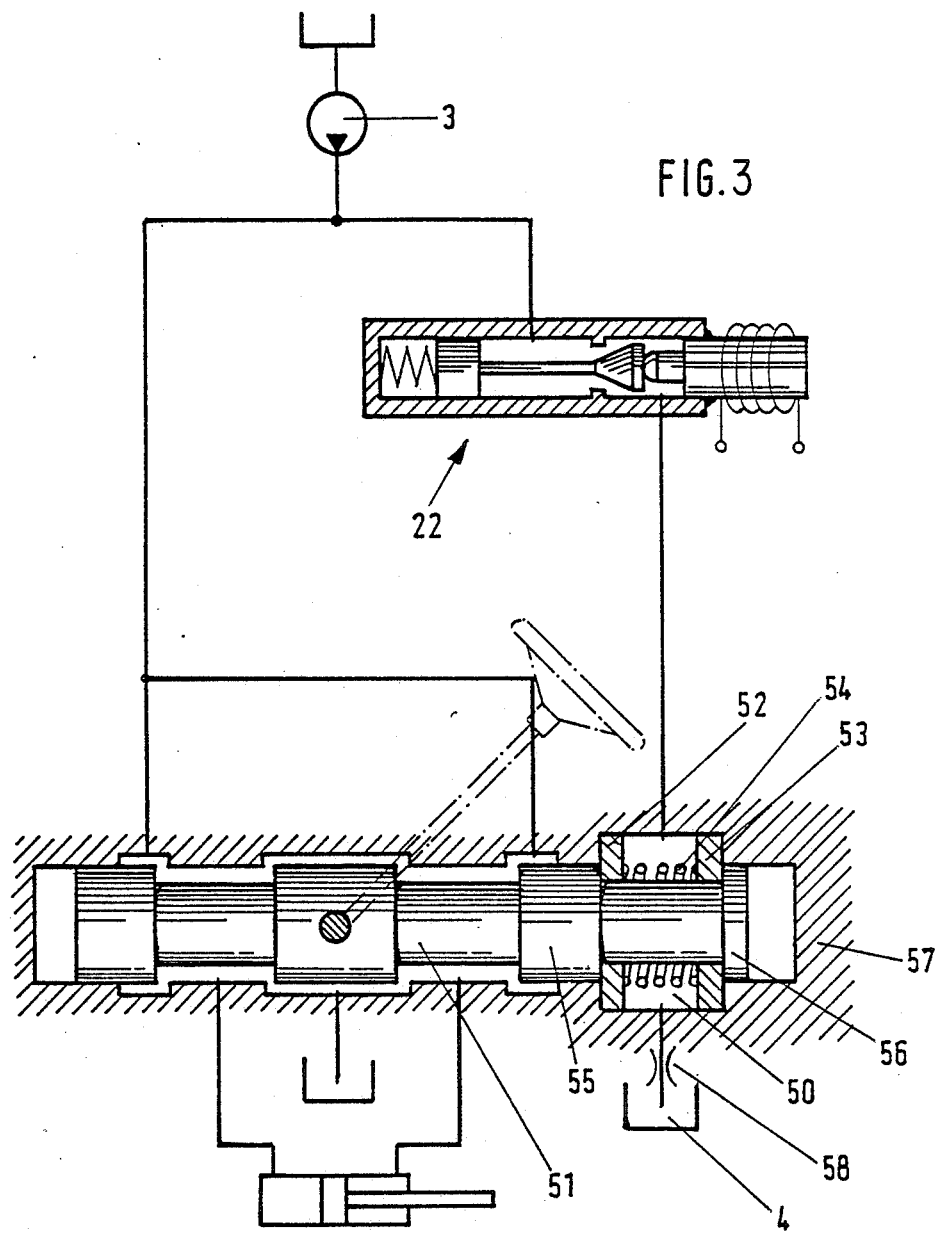
FIG. 3 is another embodiment of the invention.

In FIG. 3 when valve 22 is closed, at low speed by solenoid means, chamber 50 is merely at tank pressure which could be atmospheric or just a few pounds. Therefore, there is no steering resistance. At high speed, valve 22 is open, there is pressure in chamber 50. As steering control valve piston 51 is moving to the right, it must push collar 52 against the oil in chamber 50. Such oil is forced through restrictor 58 to maintain upstream of restrictor 50 a pressure in chamber 50 for steering resistance. The oil downstream at lower pressure flows to the tank 4.

As the steering valve piston 51 is moved to the left, the operation is reversed. Thus, collar 53 is now pulled to the left against the pressure in chamber 50, which pressure is again maintained by restrictor 58 to effect steering resistance.

OPERATION

The neutral position of the steering valve 1 is shown in FIG. 2, the pressure grooves 9 and 10 being pressureless and the check reaction chambers 15 and 16 are balanced due to the connected fixed restrictors 20 and 21.

If, for a steering operation the steering valve 6 is shifted by the steering wheel to the right, a pressure buildup occurs in now pressurized groove 10, (the central groove 13, which is for return oil via conduit 14 to tank 4) is cut off from pressurized groove 10).

The pressure oil passes via check valve 48 into reaction chamber 16. If at this time the vehicle is at low speed (maximum inverse energization of solenoid means 28) the valve opening 30 is closed, and there is no flow to the tank, then the pressure oil passes further via fixed orifices 21 and 20 into reaction chamber 15. The check valve 47 then being closed prevents pressure oil flow to pressure groove 9 for return flow via conduit 14.

In the event that the valve gap 30 remains closed, there is no differential pressure acting on the steering valve 6, the pressures in the reaction chambers being then balanced (by connection between the reaction chambers via the respective fixed restrictors and conduits 17, 18, 19, valve gap 30 being closed and therefore no side flow therethrough to the tank).

The above realization of a little or no steering resistance during parking and low speeds is advantageous in the reduction of manually steering effort, especially in making tight turns at low speed when servomotor pressure is high but prevented from effecting a differential pressure between the reaction chambers.

At high vehicle speeds, with the valve gap 30 of control mechanism 22 open due to low energization current in the inverse proportion magnet means and wider opening bias of the spring, assume steering valve 6 is shifted again to the right. Pressure oil (from reaction chamber 16) now flows through check valve 48 and restrictor 21 via the open valve gap 30 of control mechanism 22 to tank 4. As a result, tank pressure prevails between restrictor orifice 21 and the control mechanism 22 which pressure passes via restrictor orifice 20 to reaction chamber 15. Thus the full servomotor pressure (in reaction chamber 16) requires increased manual force for steering under such conditions.

Figure 4:
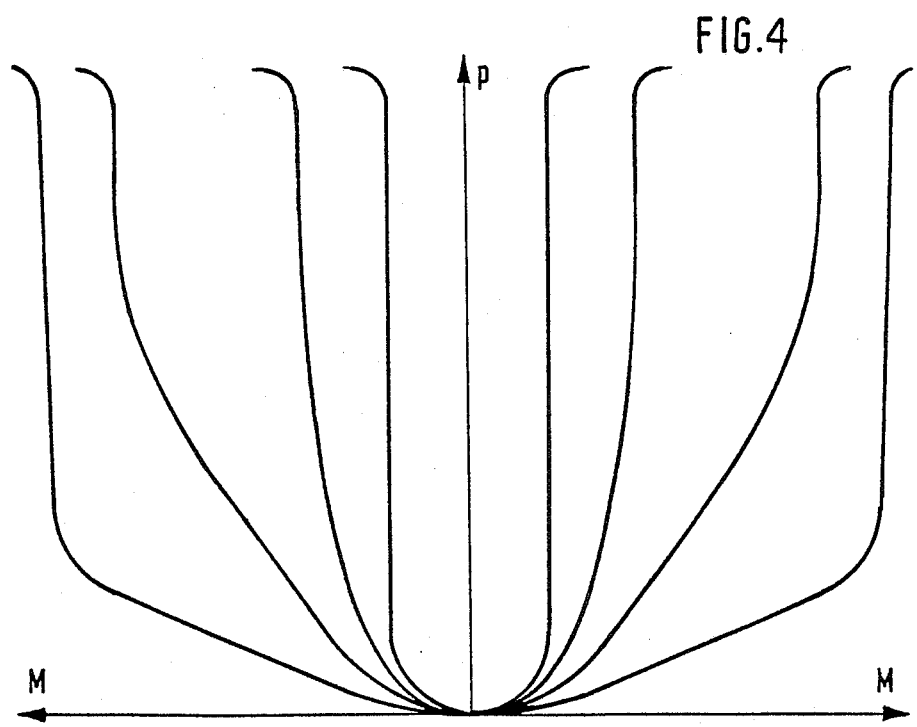
FIG. 4 shows a graph of characteristic lines of the servosteering system of the invention at various speeds.

In the graph of FIG. 4, the characteristic lines at several speeds, the outermost speed being high speed and the innermost speed being low speed, is shown for left and right steering, wherein the abscissa, M, represents manual steering force at the steering wheel, and the ordinate, p, represents servomotor pressure. In low speeds, the characteristic line has a steep angle shown virtually vertical, while as the speed increases, the characteristic lines become slanted away from the vertical, as is apparent.

Contrasting to the characteristic lines of the prior art as heretofore explained, the characteristic lines of the servosteering arrangement of the invention show a progressive changing with higher pressures. In practice, this means high manual forces at the steering wheel are needed for straight-ahead travel to achieve good stability, but a lessening of such manual force occurs when a vehicle is traveling in a tight curve.

I claim:

1. In a vehicle servosteering system of the kind having a servomotor with pressure chambers, a servopump (3), a tank (4), a steering control valve (1) having reaction chamber means (15), (16) connecting to said tank through fixed respective throttle means (20, 21) wherein pressures can act in said reaction chamber means to effect steering resistance; characterized in that a pressure responsive valve (22) responsive to servosteering pressures comprises spaced shiftable members (23, 27) joined to each other and having respective opposed unequal effective pressure exposed areas (23, 25) for differential pressure force actuation; including means (17, 18, 19) whereby said unequal areas are exposed to servosteering pressure during a steering operation to effect a differential pressure force tending to close said pressure responsive valve (22); said pressure responsive valve (22) having a variable restrictor flow gap (30) controlled for variable flow therethrough downstream to said tank by shifting of said members to variably open or close flow to said tank; including bias means (29) tending to open flow to said tank; wherein pressure acting on said unequal areas effects a differential pressure actuating force on said members to aid closing of said gap against said bias means (29); including means (28) electrically responsive inversely in proportion to vehicle speed operative when energized to aid said differential pressure actuating force in the closing of said variable restrictor flow gap against said opening bias force, whereby when said gap is closed, flow is being closed to said tank at low vehicle speeds and reaction pressure being then reduced in said reaction chamber means for low steering resistance; wherein said variable flow resistor gap is opened at high vehicle speed when said electrically responsive means is deenergized to permit flow opening of said gap by said bias means (29) whereby flow from one pressure chamber means to said tank effects a differential pressure in said reaction chamber means to effect an increase in in steering resistance.

2. In a vehicle servosteering system as set forth in claim 1, wherein one said member is a valve head (23) including housing means in which said members are shiftable; a valve seat (26) in said housing means engageable by said valve head; said valve head and valve seat effecting said variable flow gap (30) and said bias means (29) biasing said valve head and valve seat to effect opening of said variable flow gap responsive to increasing vehicle speed upon deenergization of said electrically responsive means.

3. In a vehicle servosteering system as set forth in claim 2, wherein said valve head has the smaller area to effect a differential pressure force in a direction tending toward opening of said gap and being tapered for variable effective pressure exposure area; to effect closure against said valve seat (26) wherein said valve seat has an opening area smaller than the effective pressure exposed area (25) of said other shiftable member (27).

4. In a vehicle servosteering system as set forth in claim 1, wherein said solenoid means comprises a proportional magnet solenoid operated electromagnet having a member operable on said valve heat for closure against said valve seat.

5. In vehicle servosteering system of the kind having a servomotor with pressure chambers, a servopump (3), a tank (4), a steering control valve (1) having at least one reaction chamber means (15, 16) (50) connecting to at least one fixed respective throttle means (20,21) (58) wherein reaction pressure can act in said reaction chamber means to effect steering resistance; the improvement wherein a pressure operative valve (22) connects to the reaction chamber means, and is variably operable toward closure by system existing pressure; including bias means (29) acting on said pressure operative valve for opening thereof and means whereby opening effects system return pressure to said tank; a proportional magnet solenoid means (28) inversely energized in response to vehicle speed and being coupled to said pressure operative valve for effecting closure when energized to thereby aid said pressure operative valve toward closure at low speed to cut off flow to said tank whereby pressure in said reaction chamber means is reduced for effecting low reaction pressure to reduce manual steering effort; and whereby at high speeds the solenoid means is reduced in force to permit opening of said pressure operative valve by said bias means so system pressure prevails in said reaction chamber means to effect a high steering resistance for safe steering.

6. In a vehicle servosteering system as set forth in claim 5, wherein said solenoid means comprises a proportional magnet solenoid.

7. A servosteering system especially for motor vehicle comprising a servomotor (2), a servopump (3), a tank (4), a steering control valve (1, 51), reaction chamber means (15, 16, 50) connecting through fixed restrictor means (20, 21, 58), and a control mechanism (22) comprising variable restrictor means controlling flow to said tank; characterized by said variable restrictor means having means (23, 25, 26) for decreasing flow to said tank with increasing servosteering pressure and additional means (28) independently operative on said variable restrictor means to decrease flow through said variable restrictor means with said decreasing speed.

8. In a servosteering system as set forth in claim 7, wherein said servopump connects to said variable restrictor means for servosteering system flow control therethrough; said reaction chamber means being a single reaction chamber (50); a fixed restrictor (58); said reaction chamber connecting through said fixed restrictor (58) to said tank; said steering control valve (51) having means comprising collars (52, 53) spaced in said reaction chamber (50) and a spring (54) therein maintaining a spacing of said collars; said collars being exposed to servosteering pressure in said reaction chamber; including respective abutments (55, 56) movable by said steering control valve for moving either collar, dependent on steering direction, against said pressure in said reaction chamber to effect steering resistance.

9. In a servosteering steering system as set forth in claim 8, wherein said collars are carried on said steering control valve (51); a housing for said steering control valve and said abutments being walls of said housing forming said reaction chamber (50).

* * * * *